United States Patent
Sekine (10) Patent No.: US 8,649,072 B2
(45) Date of Patent: Feb. 11, 2014

(54) IMAGING SYSTEM, SOLID-STATE IMAGING DEVICE FOR THE IMAGING SYSTEM, AND METHOD FOR MANUFACTURING THE SOLID-STATE IMAGING DEVICE FOR THE IMAGING SYSTEM

(75) Inventor: Hirokazu Sekine, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 71 days.

(21) Appl. No.: 13/417,452

(22) Filed: Mar. 12, 2012

(65) Prior Publication Data

US 2012/0307323 A1 Dec. 6, 2012

(30) Foreign Application Priority Data

May 31, 2011 (JP) ................................. 2011-121833

(51) Int. Cl.
 *H04N 1/04* (2006.01)
(52) U.S. Cl.
 USPC ............ 358/482; 358/483; 358/474; 358/498
(58) Field of Classification Search
 USPC .................. 358/482, 483, 474, 498, 496, 497
 See application file for complete search history.

(56) References Cited

FOREIGN PATENT DOCUMENTS

JP 1996-55975 * 2/1996
JP 2009-302745 12/2009

* cited by examiner

*Primary Examiner* — Houshang Safaipour
(74) *Attorney, Agent, or Firm* — Oblon, Spivak, McClelland, Maier & Neustadt, L.L.P.

(57) ABSTRACT

Certain embodiments provide an imaging system including a light guiding member supported on a circuit substrate so as to be capable of lighting an object, an optical image-forming member and a solid-state imaging device. The optical image-forming member is arranged on the circuit substrate so as to have an optical axis thereof parallel to the circuit substrate, is arranged on the circuit substrate so as to be able to receive reflected light from the object, emits the reflected light in an oblique direction with respect to a surface of the circuit substrate, and forms an image at a predetermined distance position. The solid-state imaging device includes a light receiving surface that is oblique with respect to the circuit substrate surface, and is mounted on the surface of the circuit substrate so as to have the receiving surface positioned at a position where the image is formed.

18 Claims, 9 Drawing Sheets

IMAGING SYSTEM, SOLID-STATE IMAGING DEVICE FOR THE IMAGING SYSTEM, AND METHOD FOR MANUFACTURING THE SOLID-STATE IMAGING DEVICE FOR THE IMAGING SYSTEM

CROSS REFERENCE TO RELATED APPLICATIONS

This application is based upon and claims the benefit of priority from the prior Japanese Patent Application No. 2011-121833 filed in Japan on May 31, 2011; the entire contents of which are incorporated herein by reference.

FIELD

Embodiments described herein relate generally to an imaging system, a solid-state imaging device for the imaging system, and a method of manufacturing the solid-state imaging device for the imaging system.

BACKGROUND

An imaging system of a conventional contact image sensor module (hereinafter abbreviated as contact module) type images a document that is an object as follows. That is, the document is lit by a light guiding member, and an image is formed by reflected light therefrom by a SELFOC lens array in a plurality of solid-state imaging devices arranged on a straight line. According to this, the imaging system images the document. This imaging system is used for example in a printer of a multi-function type having a scanner function.

The solid-state imaging devices are limited as of their length. Thus, in order to enable reading the document, a plurality of the solid-state imaging devices are arranged adjacent one another corresponding to a size in a width direction of the document to be read.

The conventional imaging system is configured as follows. The plurality of solid-state imaging devices are arranged adjacent one another as described above on a circuit substrate, and is connected to a wiring of the circuit substrate by wire bonding. The SELFOC lens array and the light guiding member are arranged in a space on the circuit substrate, and are supported by a housing.

In this conventional imaging system, when the document is lit by the light guiding member, the image of the document that is the reflected light therefrom is formed at a same magnification in photoelectric conversion sections of the solid-state imaging devices via the SELFOC lens array.

In this conventional imaging system, the SELFOC lens array is arranged above the photoelectric conversion sections of the plurality of solid-state imaging devices such that an optical axis of the SELFOC lens array becomes vertical with respect to the circuit substrate. Moreover, a path of the image of the document that is reflected at the document and arrives at the solid-state imaging devices is substantially vertical with respect to the circuit substrate. Accordingly, there has been a problem that a volume of the imaging system becomes large (a thickness becomes thick).

DETAILED DESCRIPTION

Certain embodiments provide an imaging system including a light guiding member, an optical image-forming member and a solid-state imaging device. The light guiding member is supported on a circuit substrate so as to be capable of lighting an object. The optical image-forming member is arranged on the circuit substrate so as to have an optical axis parallel to the circuit substrate, is arranged on the circuit substrate so as to be able to receive reflected light from the object, emits the reflected light in an oblique direction with respect to a surface of the circuit substrate, and forms an image at a predetermined distance position. The solid-state imaging device includes a light receiving surface that is oblique with respect to the circuit substrate surface, and is mounted on the surface of the circuit substrate so as to have the receiving surface positioned at a position where the image of the reflected light of the object is formed by the optical image-forming member.

Certain embodiments provide a solid-state imaging device for an imaging system including a semiconductor substrate, a first impurity region, a second impurity region and an electrode. The semiconductor substrate includes an oblique surface that is angled at a part of its surface. The first impurity region is formed on the surface of the semiconductor substrate. The second impurity region is formed at a part of the oblique surface within a surface of the first impurity region, and configures a photodiode by forming a pn junction with the first impurity region. The electrode is formed on the surface of the first impurity region excluding the oblique surface via an oxide film.

Certain embodiments provide a method for manufacturing a solid-state imaging device for an imaging system including forming a first impurity layer on a surface of a semiconductor substrate, forming an oblique portion, forming a second impurity layer and a step of forming an electrode. The oblique portion is formed on the semiconductor substrate so as to be angled obliquely with respect to a surface of the semiconductor substrate. The second impurity layer is formed on a surface of the first impurity layer that is exposed from a surface of the oblique portion, and configures a photodiode by forming a pn junction with the first impurity layer. The electrode is formed on the surface of the semiconductor substrate via an oxide film.

Hereinbelow the imaging system, the solid-state imaging device for the imaging system, and the method of manufacturing the solid-state imaging device for the imaging system will be explained.

First Embodiment

Figure 1:
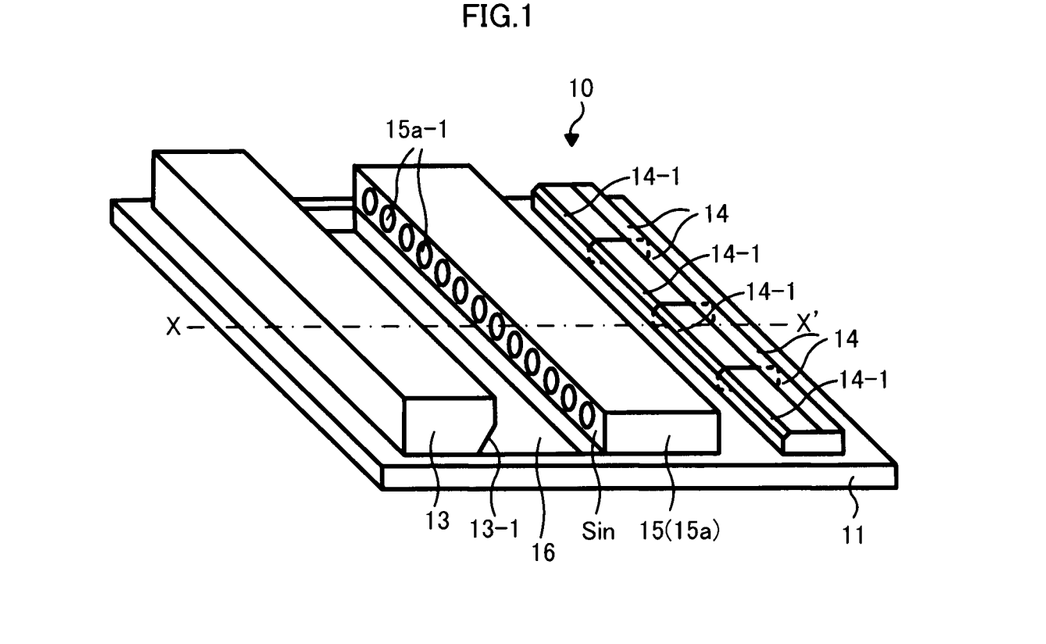
FIG. 1 is a perspective view showing an imaging system of a first embodiment.

FIG. 1 is a cross sectional view schematically showing an imaging system of a first embodiment. Further, FIG. 2 is a sectional view of the imaging system taken on a chain line X-X' of FIG. 1.

Figure 2:
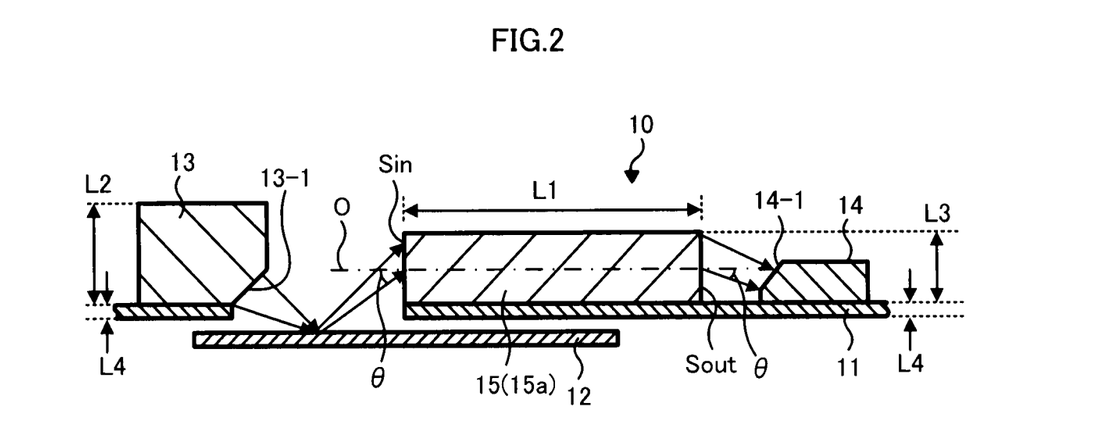
FIG. 2 is a sectional view of the imaging system taken on a chain line X-X' of FIG. 1.

A contact image sensor module (hereinafter abbreviated as a contact module) type imaging system 10 shown in FIG. 1 and FIG. 2 is a so-called line sensor module, and includes a light guiding member 13 for lighting an object, for example a document 12, a plurality of solid-state imaging devices 14 and an optical image-forming member 15 that forms an image of reflected light of the document 12 in each of the solid-state imaging devices 14, all arranged on a surface of a circuit substrate 11. Note that, a band-shaped opening portion 16 is formed on the circuit substrate 11.

This imaging system 10 reads the document 12 placed under the circuit substrate 11 through the opening portion 16 formed on the circuit substrate 11.

The light guiding member 13 has a cross section with a pentagon shape, in which one ridge line portion of a band-shaped rectangular parallelepiped is cut obliquely, where a rectangle-shaped portion that has been cut obliquely becomes an emitting surface 13-1 that emits light.

This light guiding member 13 is arranged on a surface of the circuit substrate 11 and is supported by the circuit substrate 11 so as to have the emitting surface 13-1 face toward a direction of the document 12 arranged under the circuit substrate 11, that is, have the emitting surface 13-1 face toward a direction of the opening portion 16 of the circuit substrate 11, and have a longer edge of the emitting surface 13-1 extend along and make contact with a longer edge of the opening portion 16 of the circuit substrate 11.

The light guiding member 13 arranged as aforementioned lights the document 12 placed under the circuit substrate 11 through the opening portion 16 of the circuit substrate 11.

Note that, although not shown in the drawings, LEDs for example of red, blue and green are arranged at an end portion of the light guiding member 13, and by sequentially turning those on, a color imaging of the document 12 becomes possible without having to provide color filters in the solid-state imaging devices 14.

The optical image-forming member 15 is a so-called SELFOC lens array 15a, in which a plurality of light propagating portions 15a-1 are arranged in a line. The SELFOC lens array 15a has two surfaces opposing one another as an incident surface Sin and an emitting surface Sout. The incident surface Sin has a rectangular shape, and incident end surfaces of the plurality of light propagating portions 15a-1 are exposed thereat in a line. The emitting surface Sout has a rectangular shape, and emitting end surfaces of the plurality of light propagating portions 15a-1 are exposed thereat in a line. In the SELFOC lens array 15a, each of the light emitted from the emitting surface Sout through the respective light propagating portions 15a-1 as a whole forms one continuous image.

The light propagating portions 15a-1 of the SELFOC lens array 15a are configured of typical optical fibers in which refractive indices sequentially change in a radial direction. Accordingly, as shown in FIG. 2, the SELFOC lens array 15a has a property in which an incident angle θ by which the reflected light of the document 12 is entered and an emitting angle θ by which the reflected light of the document 12 is emitted are equal. The SELFOC lens array 15a shown in FIG. 2 has a length (L1) in a direction along which light is propagated (a direction along an optical axis O shown by a chain line in FIG. 2) adjusted so that the reflected light of the document 12 entered at the incident angle θ from the lower oblique direction with respect to the surface of the circuit substrate 11 is emitted at the emitting angle θ to a lower oblique direction relative to the surface of the circuit substrate 11.

Note that, the SELFOC lens array 15a can emit the reflected light of the document 12 entered at the incident angle θ from the lower oblique direction toward an upper oblique direction at the emitting angle θ by adjusting this length L1 for example to L1'.

This SELFOC lens array 15a is arranged on the surface of the circuit substrate 11 so that the optical axis O is parallel to the circuit substrate 11, that is, the incident surface Sin and the emitting surface Sout are vertical to the surface of the circuit substrate 11. Further, the SELFOC lens array 15a is arranged on the surface of the circuit substrate 11 so that a longer edge of the incident surface Sin and the longer edge of the emitting surface 13-1 of the light guiding member 13 are parallel, and a longer edge of the emitting surface Sout and longer edges of light receiving surfaces 14-1 of the solid-state imaging devices 14 are parallel.

Further, the SELFOC lens array 15a is arranged on the surface of the circuit substrate 11 at a predetermined position so as to be capable of receiving the reflected light of the document 12 at the incident surface Sin, which had been lit by the light guiding member 13. Moreover, the SELFOC lens array 15a is arranged on the surface of the circuit substrate 11 at the predetermined position between the light guiding member 13 and the solid-state imaging devices 14 so as to emit the reflected light of the document 12 from the emitting surface Sout to the oblique direction with respect to the surface of the circuit substrate 11 and have the image formed at the light receiving surfaces 14-1 of the solid-state imaging devices 14.

The SELFOC lens array 15a is specifically arranged at the following position. That is, the SELFOC lens array 15a is arranged on the surface of the circuit substrate 11 so as to have the longer edge of the incident surface Sin extend along and make contact with a longer edge of the opening portion 16 of the circuit substrate 11 which opposes the longer edge making contact with the longer edge of the light guiding member 13.

The SELFOC lens array 15a arranged as aforementioned receives the reflected light of the document 12 arranged under the circuit substrate 11 through the opening portion 16 of the circuit substrate 11, and forms the image at the light receiving surfaces 14-1 of the solid-state imaging devices 14.

Each of the solid-state imaging devices 14 is an image sensor for the contact module (hereinafter abbreviated as a contact sensor), and has a cross section with a pentagon shape, in which one ridgeline portion of a rectangular parallelepiped is cut obliquely. The rectangle-shaped portion that has been cut obliquely is the light receiving surface 14-1 where the reflected light of the document 12 forms the image by the optical image-forming member 15. The light receiving surface 14-1 is oblique relative to the surface of the circuit substrate 11 toward a direction where the SELFOC lens array 15a is arranged.

Each of the solid-state imaging devices 14 is mounted on the surface of the circuit substrate 11 so as to have the respective light receiving surface 14-1 arranged at the position where the image is formed from the reflected light of the document 12 by the SELFOC lens array 15a.

Such plurality of solid-state imaging devices 14 are mounted on the surface of the circuit substrate 11 in a state of being arranged in a line parallel to the longer edge of the emitting surface 13-1 of the light guiding member 13 and being adjacent one another.

As shown in FIG. 2, this imaging system 10 is an ultra-slim type imaging system 10 of about 4 mm thickness, because for example a thickness L2 of the light guiding member 13 is about 3 mm, a thickness L3 of the SELFOC lens array 15a is about 1 mm and a thickness L4 of the circuit substrate 11 is about 1 mm.

Compared to this, in a conventional imaging system, a length of a SELFOC lens array is about a few millimeters, a focal length of the SELFOC lens array is about 3 mm and a thickness of a circuit substrate is about 1 mm. Accordingly, a thickness of the conventional imaging system is about 1 cm.

Figure 3:
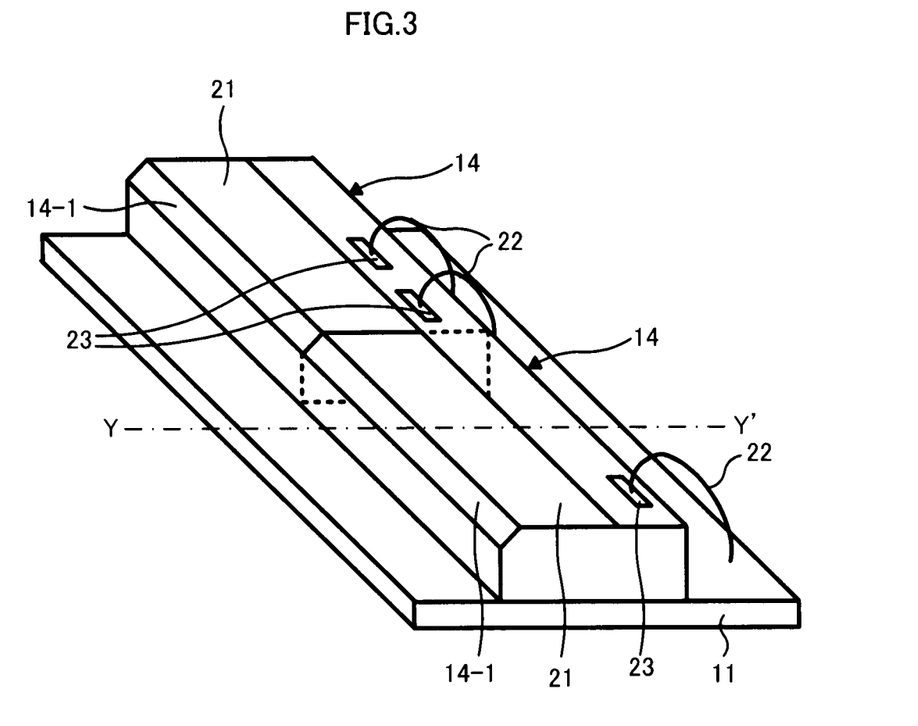
FIG. 3 is a perspective view showing a solid-state imaging device that is applied to the imaging system of FIG. 1.

FIG. 3 is a perspective view enlarging a part of the plurality of solid-state imaging devices 14 shown in FIG. 1. Further, FIG. 4 is a sectional view of the solid-state imaging device 14 taken on a chain line Y-Y' of FIG. 3.

Figure 4:
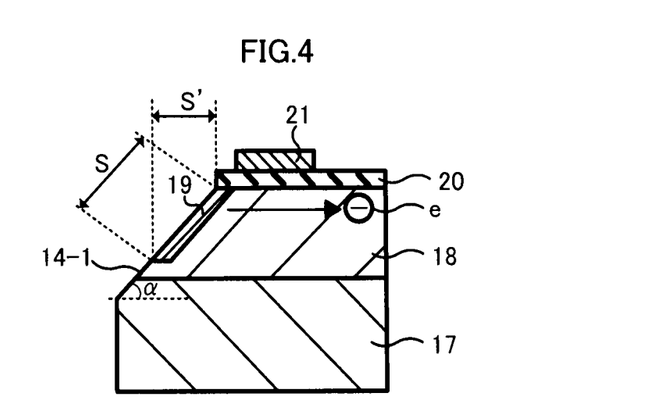
FIG. 4 is a sectional view of the solid-state imaging device taken on a chain line Y-Y' of FIG. 3.

As shown in FIG. 4, in the solid-state imaging device 14, as an N-type semiconductor substrate 17, for example an N-type silicon substrate 17 has a part of its surface formed obliquely. A P-type first impurity layer 18 is formed on a surface of this silicon substrate 17.

Of a surface of the first impurity layer 18, at a part of its obliquely formed surface, a second impurity layer 19 into which N-type impurities have been injected is formed. By this second impurity layer 19 and the P-type impurity layer 18 forming a pn junction, the photodiode that photoelectrically converts the reflected light of the document 12 as received to generate desired charges is formed.

Accordingly, by the second impurity layer 19 being formed on the obliquely formed surface of the P-type first impurity layer 18, this oblique surface functions as the light receiving surface 14-1 of the solid-state imaging device 14.

On the surface of the first impurity layer excluding the light receiving surface 14-1, a transfer electrode 21 is formed via an oxide film 20. As shown in FIG. 3, this transfer electrode 21 has a band-shape, and is formed along the light receiving surface 14-1.

When a desired voltage is applied to this transfer electrode 14-1, the charges e generated in the photodiode is transferred to a direction of an arrow in the figure.

As shown in FIG. 3, of the oxide film 20 of the solid-state imaging device 14, plural portions thereof that are separated from one another are removed in square shapes, and at the removed portions, connecting electrodes 23 for connecting the circuit substrate 11 and the solid-state imaging device 14 by bonding wires 22 are formed.

As aforementioned, when the charges e generated in the photodiode is transferred to the direction of the arrow in FIG. 4, they are propagated to wirings (not shown) on the circuit substrate 11 via the connecting electrodes 23 and the bonding wires 22. On other parts of the circuit substrate 11, an image processing section (not shown) for forming desired image data is formed, and the image processing section forms the image data based on the charges e received via the wirings.

In case where an angle formed by the light receiving surface 14-1 of the solid-state imaging device 14 and a surface parallel to the circuit substrate 11 is $\alpha$, an actual surface area S of the photodiode is substantially $1/\cos \alpha$ times an apparent surface area S' of the photodiode as seen from above. For example, in case of $\alpha=55°$, the actual surface area S of the photodiode is substantially $1/\cos 55° \approx 1.74$ times the apparent surface area S' of the photodiode as seen from above.

Accordingly, in the solid-state imaging device 14, since the photodiode is formed on the obliquely formed surface (light receiving surface 14-1) that is angled in the direction along which the reflected light of the document 12 is propagated with respect to the surface of the circuit substrate 11, the actual area of the photodiode can be increased without enlarging the size of the solid-state imaging device 14. Accordingly, the charge storing amount in the photodiode can be increased without enlarging the size of the solid-state imaging devices 14.

Figure 7:
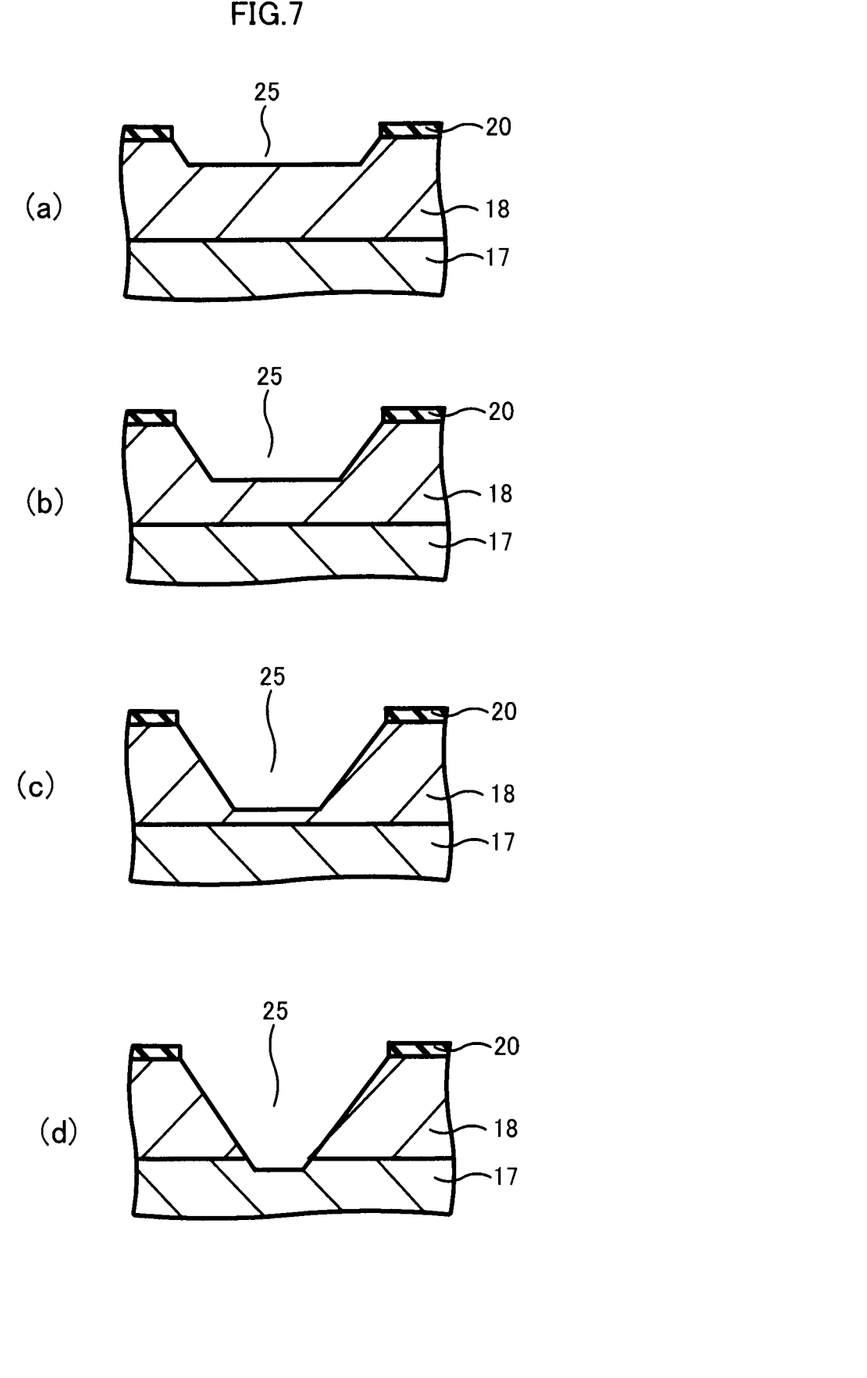
FIG. 7 is a partially enlarged view of FIG. 6 for explaining the process of etching shown in FIG. 6 in detail, and shows how the etching progresses in an order of (a) to (d)
Figure 8:
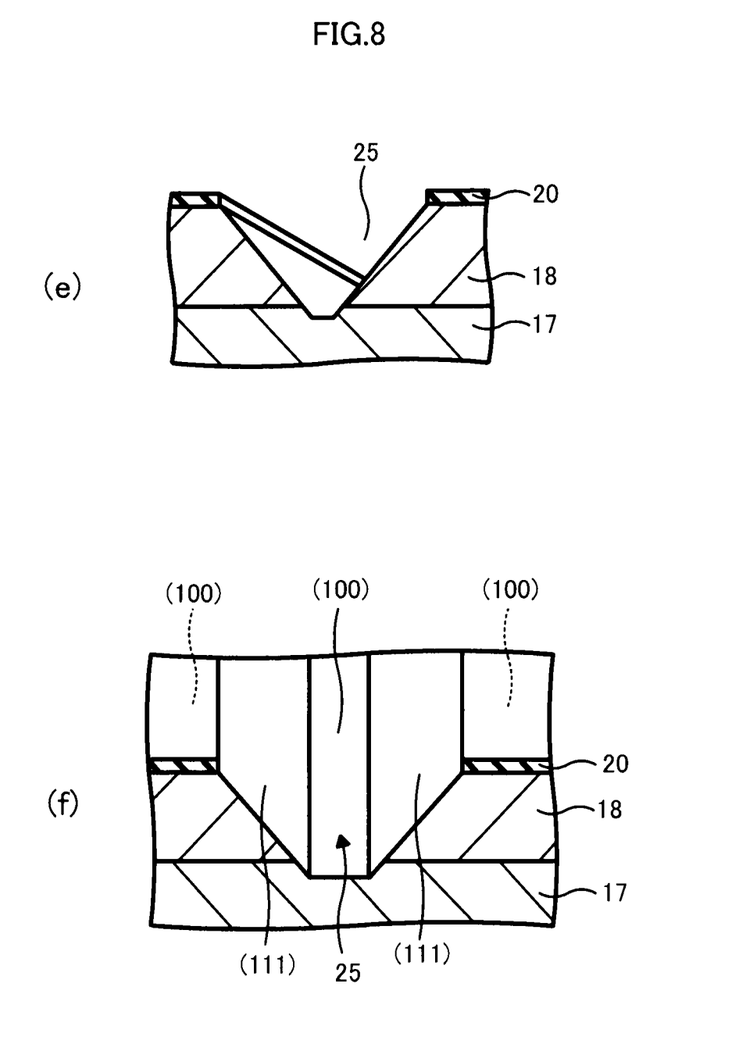
FIG. 8 is a diagram for explaining a state of FIG. 7(*d*) in further detail, (e) is a view looking up at an etching cross section from a lower-right oblique side, and (f) is a perspective view looking at the state of FIG. 7(*d*) from an upper oblique direction.

Next, the method of manufacturing the solid-state imaging device used in the imaging system of the present embodiment will be explained with reference to FIG. 5 to FIG. 10. FIG. 5 to FIG. 10 excluding FIG. 7 and FIG. 8 are sectional views corresponding to FIG. 4 for explaining the method of manufacturing the solid-state imaging device used in the imaging system of the present embodiment. FIG. 7 and FIG. 8 are diagrams for explaining the etching process in FIG. 6 in further detail.

Figure 5:
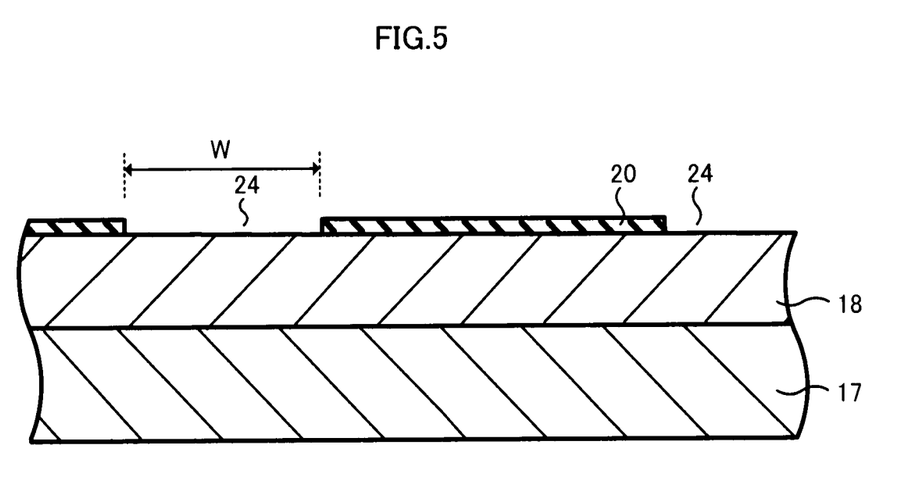
FIG. 5 is a sectional view for explaining a manufacturing method of the solid-state imaging device in FIG. 3, and is a diagram showing a process of forming an oxide film.

Firstly, as shown in FIG. 5, the P-type first impurity layer 18 is formed by ion injection on the surface of the silicon substrate 17 in a form of an N-type wafer, and further the oxide film 20 is formed on an entire surface of the silicon substrate 17 onto which the first impurity layer 18 had been formed. Subsequently, the oxide film 20 is selectively removed in a stripe pattern, and stripe-patterned opening portions 24 are formed on the oxide film 20. A width W of the opening portions 24 can be determined according to a depth D of the V-shaped grooves 25 shown in FIG. 6. The determination method of the width W of the opening portions 24 will be described later.

Figure 6:
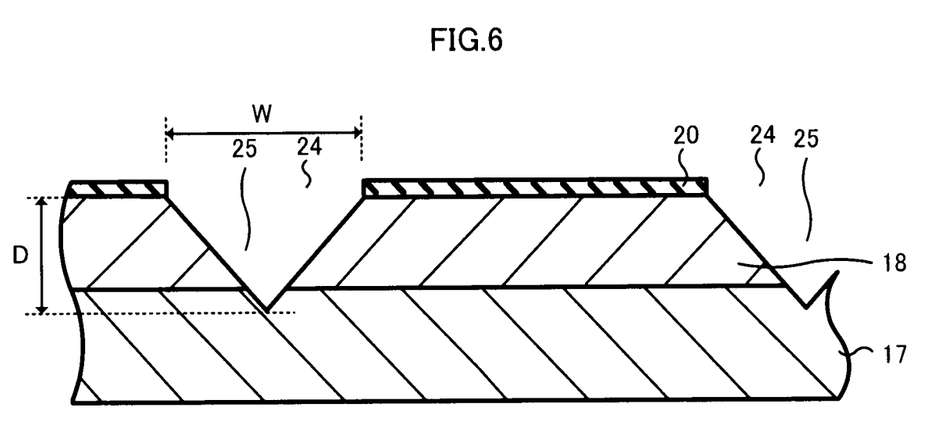
FIG. 6 is a sectional view for explaining the manufacturing method of the solid-state imaging device in FIG. 3, and is a diagram showing a process of etching.

Next, as shown in FIG. 6, the silicon substrate 17 is etched, and the V-shaped grooves 25 deeper than the first impurity layer 18 are formed directly below the respective opening portions 24 of the oxide film 20. Of the silicon substrate 17, the V-shaped grooves 25 are formed by two oblique portions that are angled with respect to the surface of the silicon substrate 17. As the etching, an alkaline etching using KOH (potassium hydroxide), TMAH (tetramethylammonium hydroxide) and the like is adapted.

Hereinafter this etching method will be explained in further detail with reference to FIG. 7 and FIG. 8. FIG. 7 is a sectional view for explaining the etching process shown in FIG. 6 in detail, and shows how the etching progresses in an order of (a) to (d). FIG. 8 is a perspective view for explaining the state of FIG. 7(d) in further detail, (e) is a view looking at the state of FIG. 7(d) from a lower oblique direction, and (f) is a view looking at the state of FIG. 7(d) from an upper oblique direction.

The alkaline etching is an etching method by which a selectivity is obtained as in an etching rate of silicon and the oxide film 20 being 100:1. Accordingly, when the alkaline etching is performed from the state shown in FIG. 5, only the silicon substrate 17 exposed from the oxide film 20 starts to be etched (FIG. 7(a)).

Here, the etching rate of the alkaline etching greatly varies due to the crystal orientation of silicon also; and the etching rate ratio of (100) plane surface typically used for a main surface of a silicon semiconductor and (111) plane surface having an angle of 55 degrees with the aforementioned plane surface becomes 100:1. Accordingly, if the alkaline etching is further progressed from the state shown in FIG. 7 (a), the etching progresses to a depth direction (a direction vertical to the (100) plane surface), and hardly progresses to the oblique direction (a direction vertical to the (111) plane surface), as shown in FIG. 7 (b), FIG. 7(c) and FIG. 7(d). Accordingly, the V-shaped grooves 25 are finally formed.

Note that, as a method of indicating the crystal plane surfaces, expressions such as the (100) plane surface, the (111) plane surface and the like as above are generally used, however, to further distinguish the crystal plane surfaces, there are cases of using (100), (−100) and the like. Here, descriptions will be given with these reference signs abbreviated for the purpose of simplifying the explanation.

Note that, as shown in FIG. 8(e), an undercut is not provided on the silicon substrate 17 (first impurity layer 18) under the oxide film 20. FIG. 8(e) is a figure looking up at an etching cross-section from a lower-right oblique side. This means that the etching of the (111) plane surface scarcely progresses. Due to this, despite the alkaline etching being a wet etching, the opening width W of the opening portions 24 of the oxide film 20 can be determined from the desired depth D based on a following formula 1 showing a relationship of the opening width W of the opening portions 24 of the oxide film 20 and the depth D of the V-shaped grooves 25.

$$D=(W/2)\times\tan 55°=0.71\ W \qquad \text{(formula 1)}$$

However, 55° in the formula 1 corresponds to the silicon crystal plane surface (111) (FIG. 8(f)) having an angle of 55 degrees with respect to the silicon main surface (100) (FIG. 8(f)).

Further, a typical silicon wafer has an orientation flat showing a crystal orientation formed on the (110) plane surface. Further, a notch is also formed on a wafer edge portion in this direction. Since patterns of devices are formed on a wafer with this (110) plane surface as a reference, the aforementioned (111) plane surface is formed in a direction along which the devices are arranged. Due to this, the (111) plane surface is formed opposing the V-shaped grooves 25.

Figure 9:
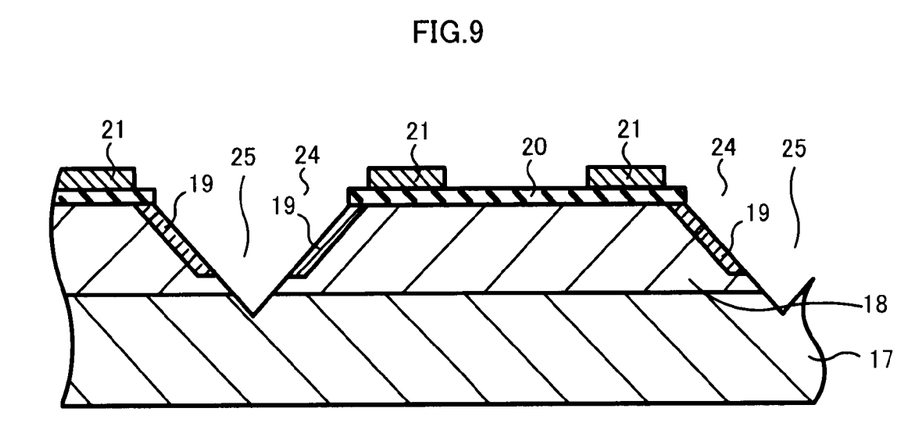
FIG. 9 is a sectional view for explaining the manufacturing method of the solid-state imaging device in FIG. 3, and is a diagram showing a process of forming a second impurity layer.

When the V-shaped grooves 25 are formed on the silicon substrate 17, next, as shown in FIG. 9, P-type ions are injected from an oblique direction into the first impurity layer 18 exposed from both sides of the V-shaped grooves 25, and P-type second impurity layers 19 are formed. Subsequently, a plurality of transfer electrodes 21 are formed on the oxide film so as to interpose the V-shaped grooves 25 therebetween. Further, although not shown in the drawings, predetermined regions of the oxide film 20 are removed, and the connecting electrodes 23 are formed in the removed portions.

Figure 10:
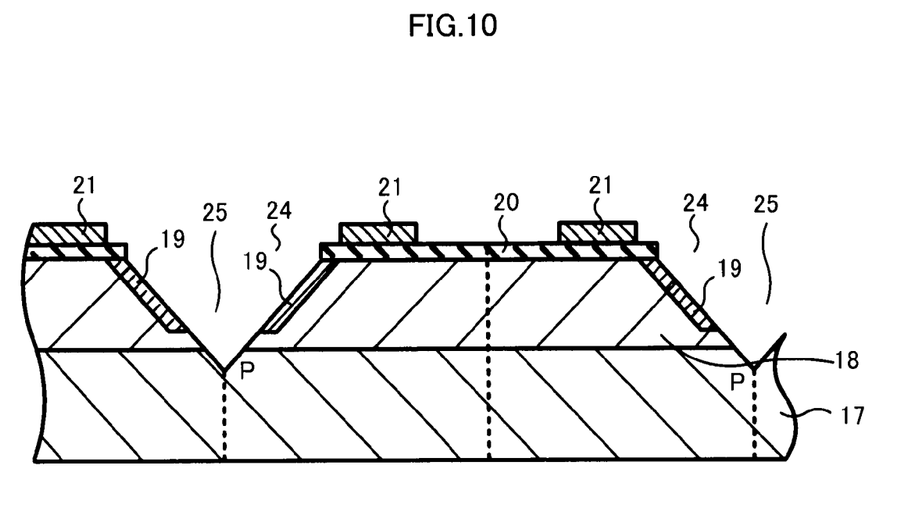
FIG. 10 is a sectional view for explaining the manufacturing method of the solid-state imaging device in FIG. 3, and is a diagram showing a process of cutting a semiconductor substrate.

Next, as shown in FIG. 10, the silicon substrate 17 directly below apex portions P of the V-shaped grooves 25 is cut, and the oxide film 20 and the silicon substrate 17 are cut along a dicing line (dotted line in the drawing) formed between the transfer electrodes 21. Due to this, the plurality of solid-state imaging devices 14 are formed at once.

The solid-state imaging devices 14 of the present embodiment may be manufactured by undergoing the above processes.

After having manufactured the solid-state imaging devices 14 as above, the light guiding member 13 and the SELFOC lens array 15a are arranged on the predetermined positions on the surface of the circuit substrate 11, and the plurality of solid-state imaging devices 14 are mounted at the predetermined positions on the surface of the circuit substrate 11 so that their light receiving surfaces 14-1 are respectively angled toward the direction where the SELFOC lens array 15a is arranged with respect to the surface of the circuit substrate 11 and are adjacent one another. According to this, the imaging system 10 of the first embodiment can be manufactured.

According to the imaging system, the solid-state imaging device for the imaging system and the method of manufacturing the solid-state imaging device used in the imaging system of the present embodiment, the SELFOC lens array 15a is arranged so that the optical axis O becomes parallel to the circuit substrate 11. Further, the solid-state imaging devices 14 are arranged at positions where the light emitted from the SELFOC lens array 15a in a direction substantially parallel to the circuit substrate 11 can be received. Consequently, the path of the light that is reflected at the document 12 and reaches the light receiving surfaces 14-1 of the solid-state imaging devices 14 can be made to be in the direction parallel to the circuit substrate 11. Consequently, the imaging system having smaller volume (thinner thickness) than the conventional imaging system, the solid-state imaging device for the imaging system and the method of manufacturing the solid-state imaging device used in the imaging system can be provided.

Further, according to the imaging system, the solid-state imaging device for the imaging system and the method of manufacturing the solid-state imaging device used in the imaging system of the present embodiment, the solid-state imaging devices 14 having the light receiving surfaces 14-1 angled to the direction where the SELFOC lens array 15a is arranged with respect to the surface of the circuit substrate 11 are manufactured, and these are used in the imaging system. Consequently, compared to the imaging system in which the conventional solid-state imaging devices including the light receiving surfaces parallel to the circuit substrate 11 are used, light receiving surface area can be increased. Accordingly, the imaging system with satisfactory light-receiving sensitivity, the solid-state imaging device for the imaging system and the method of manufacturing the solid-state imaging device used in the imaging system can be provided.

Further, according to the imaging system, the solid-state imaging device for the imaging system and the method of manufacturing the solid-state imaging device used in the imaging system of the present embodiment, the solid-state imaging devices 14 having no glass substrate arranged on the oblique light receiving surfaces 14-1 are manufactured, and these are used in the imaging system. Consequently, the reflected light of the document 12 provided in a small gap between the solid-state imaging devices 14 is evenly provided to the light receiving surfaces 14-1 of the two solid-state imaging devices 14 forming the gap. Accordingly, the imaging system that can improve repeatability of the image of the object, the solid-state imaging device for the imaging system and the method of manufacturing the solid-state imaging device used in the imaging system can be provided.

Second Embodiment

Figure 11:
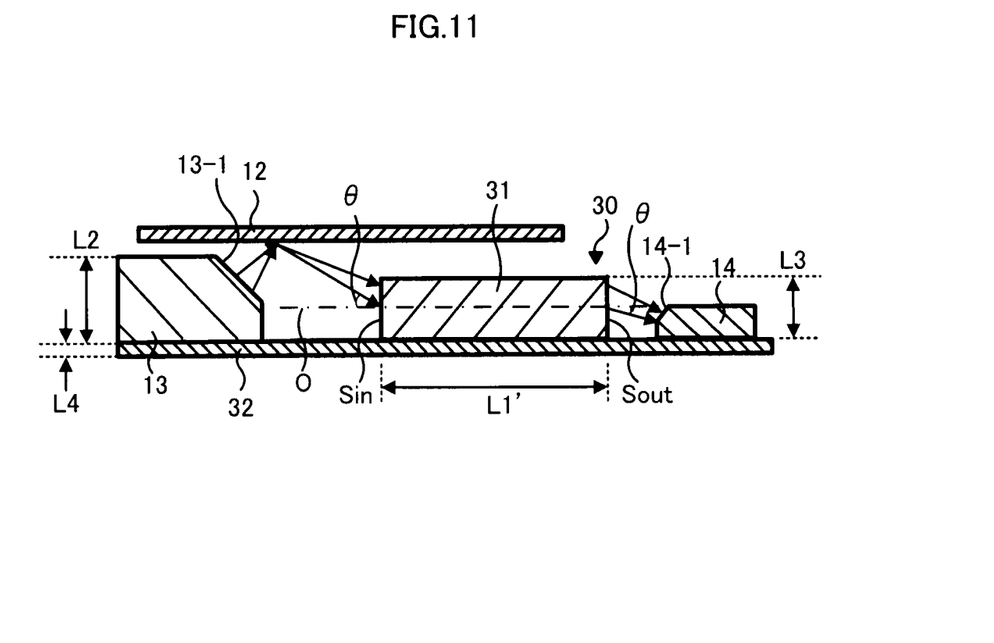
FIG. 11 is a cross sectional view showing an imaging system of a second embodiment.

FIG. 11 is a cross sectional view schematically showing an imaging system 30 of a second embodiment, corresponding to FIG. 2. The imaging system 30 shown in FIG. 11 reads the document 12 placed on the imaging system 30. Compared to the imaging system 10 of the first embodiment, the imaging system 30 shown in FIG. 11 is different in the orientation by which the light guiding member 13 is arranged, the length of a SELFOC lens array 31 and the shape of a circuit substrate 32.

The light guiding member 13 has the same shape as the light guiding member 13 in the imaging system 10 of the first embodiment. However, this imaging system 30 reads the document 12 arranged above the imaging system 30, that is, above the circuit substrate 32. Accordingly, the light guiding member 13 is arranged on and supported by the surface of the circuit substrate 32 so as to have the emitting surface 13-1 face toward the direction of the document 12 arranged above the circuit substrate 32.

The light guiding member 13 arranged as aforementioned enables lighting the document 12 placed above the circuit substrate 32.

Further, as shown in FIG. 11, the SELFOC lens array 31 emits the reflected light of the document entered at the incident angle θ from the upper oblique direction of where the document 12 is arranged toward the lower oblique direction at the emitting angle θ by adjusting this length L1'.

The SELFOC lens array 31 having such length L1' receives the reflected light of the document 12 placed above the circuit substrate 32 and forms an image at the light receiving surfaces 14-1 of the solid-state imaging devices 14.

Note that, this system 30 is for reading the document 12 placed above the imaging system 30, that is the circuit substrate 32, so an opening portion need not be formed on the circuit substrate 32.

As shown in FIG. 11, this imaging system 30 is an ultraslim type imaging system of about 4 mm thickness, because for example the thickness L2 of the light guiding member 13 is about 3 mm, a thickness L3 of the SELFOC lens array 31 is about 1 mm and a thickness L4 of the circuit substrate 32 is about 1 mm.

Compared to the method of manufacturing the imaging system 10 of the first embodiment, a method of manufacturing the imaging system 30 as explained above is identical except for the orientation of the light guiding member 13, the length of the SELFOC lens array 31 and the shape of the circuit substrate 32 being different. Accordingly, an explanation of the method of manufacturing the imaging system 30 will not be repeated here.

In the imaging system, the solid-state imaging device for the imaging system and the method of manufacturing the solid-state imaging device used in the imaging system of the present embodiment also, the SELFOC lens array 31 is arranged so that its optical axis O becomes parallel to the circuit substrate 32. Further, the solid-state imaging devices 14 are arranged at positions where the light emitted from the SELFOC lens array 31 in the direction substantially parallel to the circuit substrate 32 can be received. Consequently, the path of the light that is reflected at the document 12 and reaches the light receiving surfaces 14-1 of the solid-state imaging devices 14 can be made to be in the direction parallel to the circuit substrate 32. Consequently, the imaging system having smaller volume (thinner thickness) than the conventional imaging system, the solid-state imaging device for the imaging system and the method of manufacturing the solid-state imaging device used in the imaging system can be provided.

Further, according to the imaging system, the solid-state imaging device for the imaging system and the method of manufacturing the solid-state imaging device used in the imaging system of the present embodiment also, the solid-state imaging devices 14 having the light receiving surfaces 14-1 angled to the direction where the SELFOC lens array 31 is arranged with respect to the surface of the circuit substrate 32 and not having the glass substrate arranged on the light receiving surfaces 14-1 are manufactured, and since these are used in the imaging system, the imaging system having the satisfactory light-receiving sensitivity and that can improve the repeatability of the image of the object, the solid-state imaging device for the imaging system and the method of manufacturing the solid-state imaging device used in the imaging system can be provided.

Further, according to the imaging system, the solid-state imaging device for the imaging system and the method of manufacturing the solid-state imaging device used in the imaging system of the present embodiment, since the embodiment is for reading the document 12 placed above the imaging system 30, there is no need to form the opening portion in the circuit substrate 32. Accordingly, compared to the imaging system, the solid-state imaging device for the imaging system and the method of manufacturing the solid-state imaging device used in the imaging system of the first embodiment, the imaging system that can easily be manufactured, the solid-state imaging device for the imaging system and the method of manufacturing the solid-state imaging device used in the imaging system can be provided.

Third Embodiment

Figure 12:
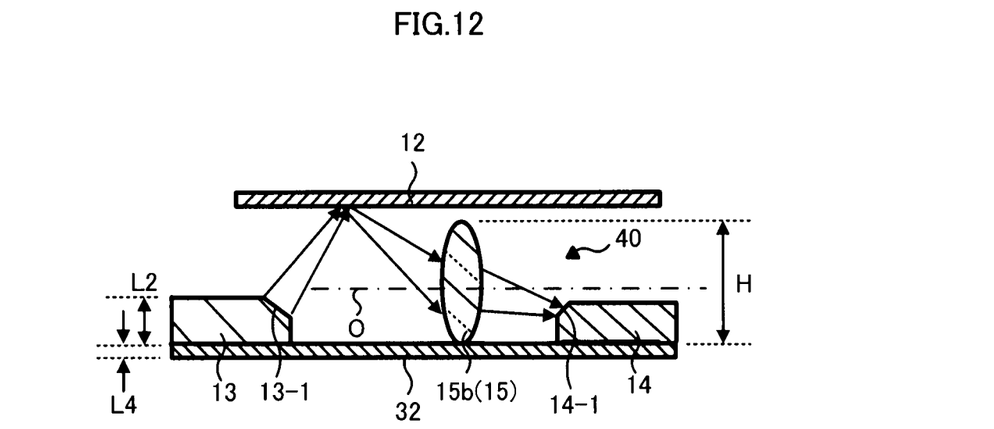
FIG. 12 is a cross sectional view showing an imaging system of a third embodiment.

FIG. 12 is across sectional view schematically showing an imaging system 40 of a third embodiment. Similar to the imaging system 30 of the second embodiment, the imaging system 40 shown in FIG. 12 is for reading the document 12 placed above the imaging system 40, that is, the circuit substrate 32, but differs in the arrangements of the optical image-forming member 15 and the plurality of solid-state imaging devices 14.

In the imaging system 40 of the third embodiment, the optical image-forming member 15 is a plurality of lenses 15b having both surfaces curved in convex shapes. Each lens 15b is arranged so that an optical axis O is parallel to the circuit substrate 32. Although not shown in the drawings, these plurality of lenses 15b are arranged in a line toward a vertical direction to a sheet surface.

Each lens 15b is arranged on the surface of the circuit substrate 32 so as to receive the reflected light of the document 12, emit the received reflected light to the oblique direction with respect to the surface of the circuit substrate 32 and form an image in the light receiving surface 14-1 angled toward the direction where the lenses 15b are arranged with respect to the surface of the circuit substrate 32 in the corresponding solid-state imaging device 14. Accordingly, the plurality of solid-state imaging devices 14 don't need to be arranged to make contact with one another, and simply needs to be arranged so that the light receiving surfaces 14-1 are arranged at the positions where the image is formed from the reflected light of the document 12 by the respective lenses 15b.

As shown in FIG. 12, this imaging system 40 is an ultraslim type imaging system of about 4 mm thickness, because for example the thickness L2 of the light guiding member 13 is about 3 mm, a height H of each lens 15b is about 3 mm and the thickness L4 of the circuit substrate 32 is about 1 mm.

Compared to the method of manufacturing the imaging system 30 of the second embodiment, a method of manufacturing the imaging system 40 as explained above is identical except for the arrangements of the solid-state imaging devices 14 and the optical image-forming member 15 being different.

Accordingly, an explanation of the method of manufacturing the imaging system 40 will not be repeated here.

In the imaging system, the solid-state imaging device for the imaging system and the method of manufacturing the solid-state imaging device used in the imaging system of the present embodiment also, the lenses 15b are arranged so that their optical axes O becomes parallel to the circuit substrate 32. Further, the solid-state imaging devices 14 are arranged at positions where the light emitted from the lenses 15b in the direction substantially parallel to the circuit substrate 32 can be received. Consequently, the path of the light that is reflected at the document 12 and reaches the light receiving surfaces 14-1 of the solid-state imaging devices 14 can be made to be in the direction parallel to the circuit substrate 32. Consequently, the imaging system having smaller volume (thinner thickness) than the conventional imaging system, the solid-state imaging device for the imaging system and the method of manufacturing the solid-state imaging device used in the imaging system can be provided.

Further, according to the imaging system, the solid-state imaging device for the imaging system and the method of manufacturing the solid-state imaging device used in the imaging system of the present embodiment also, the solid-state imaging devices 14 having the light receiving surfaces 14-1 angled to the direction where the lenses 15b are arranged with respect to the surface of the circuit substrate 32 and not having the glass substrate arranged on the light receiving surfaces 14-1 are manufactured, and since these are used in the imaging system, the imaging system having the satisfactory light-receiving sensitivity and that can improve the repeatability of the image of the object, the solid-state imaging device for the imaging system and the method of manufacturing the solid-state imaging device used in the imaging system can be provided.

Further, according to the imaging system, the solid-state imaging device for the imaging system and the method of manufacturing the solid-state imaging device used in the imaging system of the present embodiment, in the plurality of solid-state imaging devices 14, the light receiving surfaces 14-1 simply need to be arranged at the positions where the image is formed from the reflected light of the document by each of the respective lenses 15b, and the plurality of solid-state imaging devices 14 don't need to be arranged to make contact with one another. Accordingly, compared to the imaging system, the solid-state imaging device for the imaging system and the method of manufacturing the solid-state imaging device used in the imaging system of the second embodiment, in the imaging system, the solid-state imaging device for the imaging system and the method of manufacturing the solid-state imaging device used in the imaging system of the present embodiment, since a high arrangement accuracy of the solid-state imaging devices 14 is not required, the imaging system that can easily be manufactured, the solid-state imaging device for the imaging system and the method of manufacturing the solid-state imaging device used in the imaging system can be provided.

Fourth Embodiment

Figure 13:
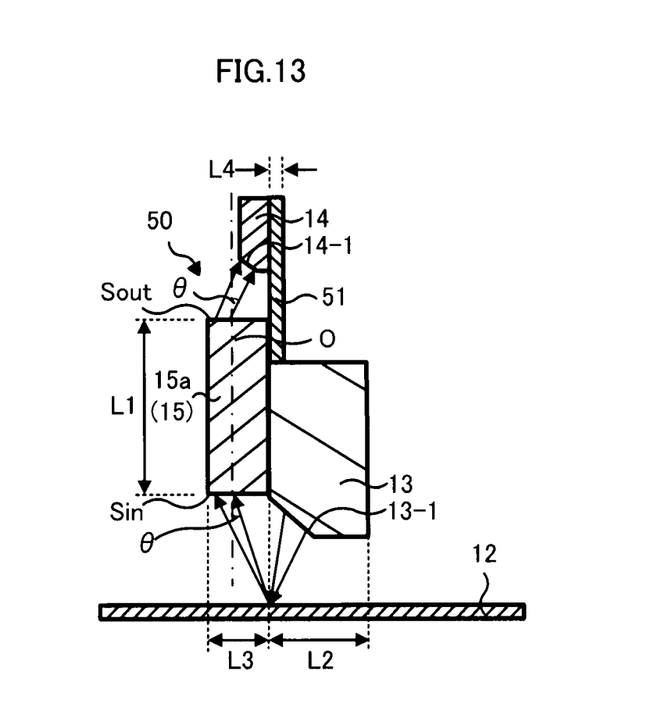
FIG. 13 is a cross sectional view showing an imaging system of a fourth embodiment.

FIG. 13 is a cross sectional view schematically showing an imaging system 50 of a fourth embodiment. The imaging system 50 shown in FIG. 13 reads the document 12 arranged at a side of a circuit substrate 51. Compared to the imaging system 10 of the first embodiment, the imaging system 50 shown in FIG. 13 is different in the arrangements of the SELFOC lens array 15a and the light guiding member 13 and the shape of the circuit substrate 51.

The SELFOC lens array 15a is arranged on a surface of the circuit substrate 51 with a part of the SELFOC lens array 15a extending off of the circuit substrate 51 so that the optical axis is parallel to the circuit substrate 51, that is, the incident surface Sin and the emitting surface Sout are vertical to the surface of the circuit substrate 51. Further, the SELFOC lens array 15a is arranged on the surface of the circuit substrate 51 with its part extending off of the circuit substrate 51 so as to have the longer edge of the incident surface Sin make contact with the longer edge of the emitting surface 13-1 of the light guiding member 13 and have the longer edge of the emitting surface Sout be parallel to the longer edges of the light receiving surfaces 14-1 of the solid-state imaging devices 14.

Further, the SELFOC lens array 15a is arranged at the predetermined position on the surface of the circuit substrate 51 so as to receive the reflected light of the document 12 lit by the light guiding member 13 at the incident surface Sin, emit the received reflected light to the oblique direction with respect to the surface of the circuit substrate 51 from the emitting surface Sout and form an image in the light receiving surfaces 14-1 of the solid-state imaging devices 14.

Note that, similar to FIG. 2, the SELFOC lens array 15a has its length L1 in the direction along which light is propagated (direction along optical axis O shown in chain line in FIG. 13) adjusted so that the incident angle θ by which the reflected light of the document 12 is entered and the emitting angle θ by which the reflected light of the document 12 is emitted are equal.

Further, the light guiding member 13 is arranged to make contact with a side surface of the circuit substrate 52, and within the SELFOC lens array 15a, it is fixed to the part that extends off of the circuit substrate 52 so as to have its emitting surface 13-1 face toward the direction of the document 12 arranged on the side of the circuit substrate 51. That is, the light guiding member 13 is indirectly supported by the circuit substrate 52 via the SELFOC lens array 15a.

According to this, the light guiding member 13 lights the document 12 arranged on the side of the circuit substrate 52, and the reflected light of the document 12 is entered to the incident surface Sin of the SELFOC lens array 15a.

Note that, this system 50 is for reading the document 12 placed on the side of the imaging system 50, that is, the circuit substrate 51, so an opening portion need not be formed on the circuit substrate 51.

As shown in FIG. 13, this imaging system 50 is an ultra-slim type imaging system of about 4 mm thickness, because for example the thickness L2 of the light guiding member 13 is about 3 mm, the thickness L3 of the SELFOC lens array 15a is about 1 mm and a thickness L4 of the circuit substrate 51 is about 1 mm.

Compared to the method of manufacturing the imaging system 30 of the first embodiment, a method of manufacturing the imaging system 50 as explained above is identical except for the arrangements of the SELFOC lens array 15a and the light guiding member 13 being different. Accordingly, an explanation of the method of manufacturing the imaging system 50 will not be repeated here.

In the imaging system, the solid-state imaging device for the imaging system and the method of manufacturing the solid-state imaging device used in the imaging system of the present embodiment also, the SELFOC lens array 15a is arranged so that its optical axis O becomes parallel to the circuit substrate 51. Further, the solid-state imaging devices 14 are arranged at positions where the light emitted from the SELFOC lens array 15a in a direction substantially parallel to the circuit substrate 51 can be received. Consequently, the path of the light that is reflected at the document 12 and reaches the light receiving surfaces 14-1 of the solid-state imaging devices 14 can be made to be in the direction parallel to the circuit substrate 51. Consequently, the imaging system having smaller volume (thinner thickness) than the conventional imaging system, the solid-state imaging device for the imaging system and the method of manufacturing the solid-state imaging device used in the imaging system can be provided.

Further, according to the imaging system, the solid-state imaging device for the imaging system and the method of manufacturing the solid-state imaging device used in the imaging system of the present embodiment also, the solid-state imaging devices having the light receiving surfaces 14-1 angled to the direction where the SELFOC lens array 15a is arranged with respect to the surface of the circuit substrate 51 and not having the glass substrate arranged on the light receiving surfaces 14-1 are manufactured, and since these are used in the imaging system, the imaging system having the satisfactory light-receiving sensitivity and that can improve the repeatability of the image of the object, the solid-state imaging device for the imaging system and the method of manufacturing the solid-state imaging device used in the imaging system can be provided.

Figure 14:
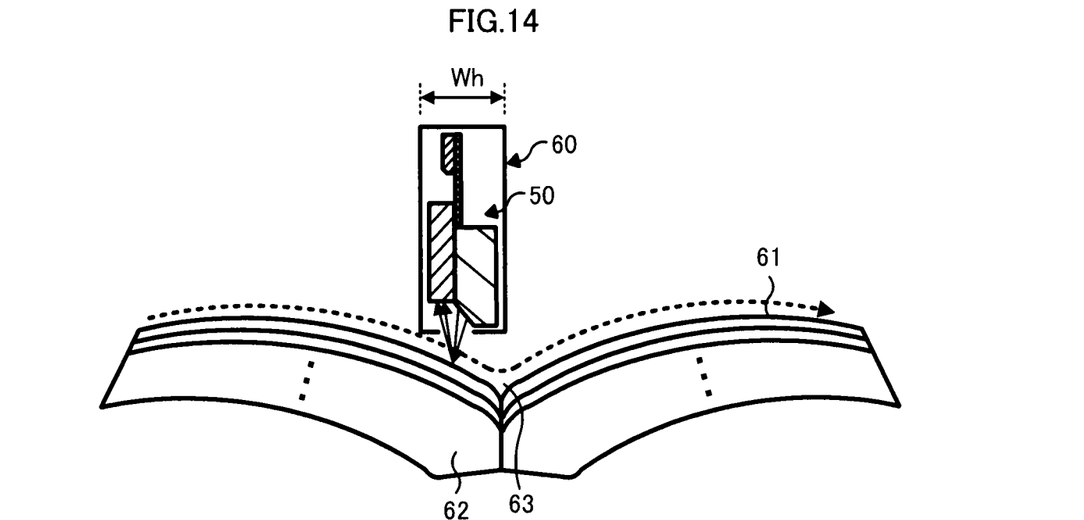
FIG. 14 is a modified example of the imaging system of the fourth embodiment.

Hereinbelow, a modified example of the imaging system 50 of the fourth embodiment will be explained. FIG. 14 is a schematic diagram showing a handy scanner into which the imaging system 50 of the fourth embodiment is adapted. Further, FIG. 15 is a schematic diagram showing a keyboard 70 into which the imaging system 50 of the fourth embodiment is adapted.

As shown in FIG. 14, by adapting this system 50 into the handy scanner 60, a handy scanner having an ultra-slim width Wh in a vertical direction relative to a document surface 61 can be realized. In this handy scanner 60, the handy scanner 60 can run a scan along the document surface 61 (along a dotted line in the drawing) even for example with a binding portion 63 (base of a page) of a thick book 62. Accordingly, a handy scanner capable of especially suppressing defocusing at the binding portion of the book 62 is provided.

Figure 15:
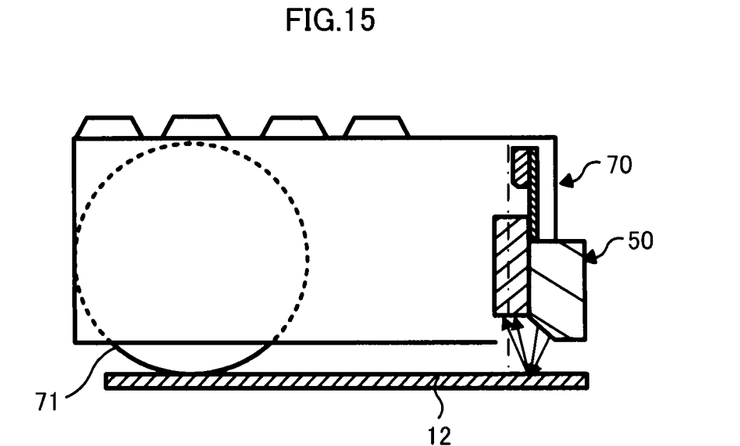
FIG. 15 is another modified example of the imaging system of the fourth embodiment.

Further, as shown in FIG. 15, this system 50 is mounted in a lengthwise direction to an end portion of the keyboard 70 of a personal computer (hereinafter referred to as PC) in a manner that the document 12 can be placed on a back side of the keyboard 70. Further, a roller 71 that protrudes out from this back side is provided in the keyboard 70. Further, an amount of movement over the document 12 is detected by the roller 71, and by synchronizing this to a signal reading timing of the imaging system 50, a PC installed with a scanner can be realized. At this occasion, since the imaging system 50 adapted to the keyboard 70 is ultra-slim type, a design of the keyboard 70 is not affected by the imaging system 50. Accordingly, a degree of freedom in the design of the keyboard 70 can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An imaging system comprising:
a light guiding member supported on a circuit substrate so as to be capable of lighting an object;
an optical image-forming member arranged on the circuit substrate so as to have an optical axis of the optical image-forming member parallel to the circuit substrate, arranged on the circuit substrate so as to be able to receive reflected light from the object, that emits the reflected light in an oblique direction with respect to a surface of the circuit substrate, and forms an image at a predetermined distance position; and
a solid-state imaging device including a light receiving surface that is oblique with respect to the surface of the circuit substrate, and being mounted on the surface of the circuit substrate so as to have the light receiving surface arranged at the position where the image is formed from the reflected light of the object by the optical image-forming member, the solid-state imaging device including a silicon substrate including the light receiving surface, the light receiving surface being a plane surface of the silicon substrate;
a first impurity region formed on a surface of the silicon substrate;
a second impurity layer formed at the light receiving surface within the surface of the first impurity region, and that configures a photodiode by forming a pn junction with the first impurity region; and
an electrode formed via an oxide film on the surface of the first impurity region excluding the light receiving surface.

2. The imaging system according to claim 1, wherein a plurality of the solid-state imaging devices are mounted on the surface of the circuit substrate in a line.

3. The imaging system according to claim 1, wherein the circuit substrate includes a band-shaped opening portion,
the light guiding member is arranged on the surface of the circuit substrate so as to be capable of lighting the object arranged under the circuit substrate through the opening portion, and
the optical image-forming member is arranged on the surface of the circuit substrate so as to form the image of the reflected light of the object received through the band-shaped opening portion at the light receiving surface of the solid-state imaging device.

4. The imaging system according to claim 3, wherein the light guiding member includes an emitting surface that is angled in a direction where the object is present with respect to the surface of the circuit substrate, and
a plurality of the solid-state imaging devices are mounted on the surface of the circuit substrate so as to be in a line and parallel to the emitting surface of the light guiding member.

5. The imaging system according to claim 4, wherein the optical image-forming member is a SELFOC lens array in which a plurality of light propagating portions are arranged in a line and parallel to the line of the plurality of solid-state imaging devices.

6. The imaging system according to claim 1, wherein the light guiding member is arranged on the surface of the circuit substrate so as to be capable of lighting the object arranged above the circuit substrate, and
the optical image-forming member is arranged on the surface of the circuit substrate so as to form an image of the reflected light of the object arranged above the circuit substrate at the light receiving surface of the solid-state imaging device.

7. The imaging system according to claim 6, wherein
the light guiding member includes an emitting surface that is angled in a direction where the object is present with respect to the surface of the circuit substrate, and
a plurality of the solid-state imaging devices are mounted on the surface of the circuit substrate so as to be in a line and parallel to the emitting surface of the light guiding member.

8. The imaging system according to claim 7, wherein
the optical image-forming member is a SELFOC lens array in which a plurality of light propagating portions are arranged in a line and parallel to the line of the plurality of solid-state imaging devices.

9. The imaging system according to claim 7, wherein
the optical image-forming is a plurality of lenses arranged in a line and parallel to the line of the plurality of solid-state imaging devices.

10. The imaging system according to claim 1, wherein
the optical image-forming member is arranged on the surface of the circuit substrate so as to have a part thereof extending off of the surface of the circuit substrate, and
the light guiding member is fixed to the optical image-forming member so as to be capable of lighting the object arranged on a side of the circuit substrate.

11. The imaging system according to claim 10, wherein
the light guiding member includes an emitting surface that is angled in a direction where the object is present with respect to the surface of the circuit substrate, and
a plurality of the solid-state imaging devices are mounted on the surface of the circuit substrate so as to be in a line and parallel to the emitting surface of the light guiding member.

12. The imaging system according to claim 11, wherein
the optical image-forming member is a SELFOC lens array in which a plurality of light propagating portions are arranged in a line and parallel to the line of the plurality of solid-state imaging devices.

13. A solid-state imaging device for an imaging system, comprising:
a semiconductor substrate including an oblique surface that is angled at a part of its surface;
a first impurity region formed on the surface of the semiconductor substrate;
a second impurity region formed at a part of the oblique surface within a surface of the first impurity region, and that configures a photodiode by forming a pn junction with the first impurity region; and
an electrode formed on the surface of the first impurity region excluding the oblique surface via an oxide film.

14. A method for manufacturing a solid-state imaging device for an imaging system, comprising:
forming a first impurity layer on a surface of a semiconductor substrate;
forming an oblique portion that is angled obliquely with respect to the surface of the semiconductor substrate on the semiconductor substrate;
forming a second impurity layer on a surface of the first impurity layer that is exposed from a surface of the oblique portion, the second impurity layer configuring a photodiode by forming a pn junction with the first impurity layer; and
forming an electrode on the surface of the semiconductor substrate via an oxide film.

15. The method for manufacturing a solid-state imaging device for an imaging system according to claim 14, wherein
the oblique portion is formed by forming a plurality of V-shaped grooves deeper than the first impurity layer on the surface of the semiconductor substrate,
the second impurity layer is formed on a surfaces of the first impurity layer exposed from respective side surfaces of the plurality of V-shaped grooves to configure the photodiode; and
the electrode is formed on the surface of the semiconductor substrate so as to interpose the V-shaped grooves therebetween via the oxide film, and
the method further includes cutting the semiconductor substrate directly below apex portions of the V-shaped grooves after having formed the plurality of electrodes, and cutting the oxide film and the semiconductor substrate along dicing lines formed between the electrodes.

16. The method for manufacturing a solid-state imaging device for an imaging system according to claim 15, wherein
the V-shaped grooves are V-shaped grooves deeper than the first impurity layer, and
the V-shaped grooves are formed by etching the semiconductor substrate exposed from band-shaped opening portions by using a difference in etching rates caused by crystal planes of the substrate after having formed the band-shaped opening portions in the oxide film on the surface of the semiconductor substrate onto which the first impurity layer had been formed.

17. The method for manufacturing a solid-state imaging device for an imaging system according to claim 16, wherein
the semiconductor substrate is a silicon substrate, and
the silicon substrate is etched by an alkaline etching.

18. The method for manufacturing a solid-state imaging device for an imaging system according to claim 16, wherein
a depth of the V-shaped grooves is determined by a width of the band-shaped opening portions.

* * * * *